United States Patent [19]

Zofchak

[11] Patent Number: 4,763,507
[45] Date of Patent: Aug. 16, 1988

[54] ADJUSTABLE BALL BAR GAUGE FOR COORDINATE MEASURING MACHINE

[75] Inventor: Joseph M. Zofchak, Mt. Morris, Mich.

[73] Assignee: Bobier Tool Supply, Inc., Flint, Mich.

[21] Appl. No.: 48,340

[22] Filed: May 11, 1987

[51] Int. Cl.⁴ ............................................. G01L 25/00
[52] U.S. Cl. ..................................................... 73/1 J
[58] Field of Search ......................... 73/1 J, 1 E, 1 R; 33/502, 503, 504, 505, 168 R, 168 B

[56] References Cited

U.S. PATENT DOCUMENTS

| | | | |
|---|---|---|---|
| 4,219,934 | 9/1980 | Davitt, Jr. | 33/168 B |
| 4,364,182 | 12/1982 | Jones | 73/1 J |
| 4,372,721 | 2/1983 | Harjar et al. | 73/1 J |
| 4,373,267 | 2/1983 | Lycan | 73/1 J |
| 4,523,450 | 6/1985 | Herzog | 73/1 J |

OTHER PUBLICATIONS

Calvin and Haas, "Jigs and Fixtures", McGraw Hill Book Co., 239 W. 39th, NY, p. 143, 1913.

Primary Examiner—Michael J. Tokar
Assistant Examiner—Robert R. Raevis
Attorney, Agent, or Firm—Cullen, Sloman, Cantor, Grauer, Scott and Rutherford

[57] ABSTRACT

An adjustable ball bar gauge is provided for use in testing the accuracy of the readings obtained in a coordinate measuring machine. Such a machine has a probe that contacts numerous points on an article arranged within its measuring envelope to produce signals that are used, through a computer, to map the shapes or dimensions of surfaces of the article. The ball bar is formed of an elongated shaft, having contact balls mounted upon its opposite ends, that is mounted upon a movable support which allows the bar to be positioned at variable height and vertically and horizontally angled positions. The ball bar support may be placed within the machine measuring envelope and its position, including its angularity, may be repeatedly changed so that the probe may successively contact both balls each time the ball bar position is changed to produce test readings from which the accuracy of the machine may be gauged. The ball support includes cooperating locating elements which are contacted by a probe to accurately locate the ball bar position within the machine envelope when the positions are changed.

14 Claims, 2 Drawing Sheets

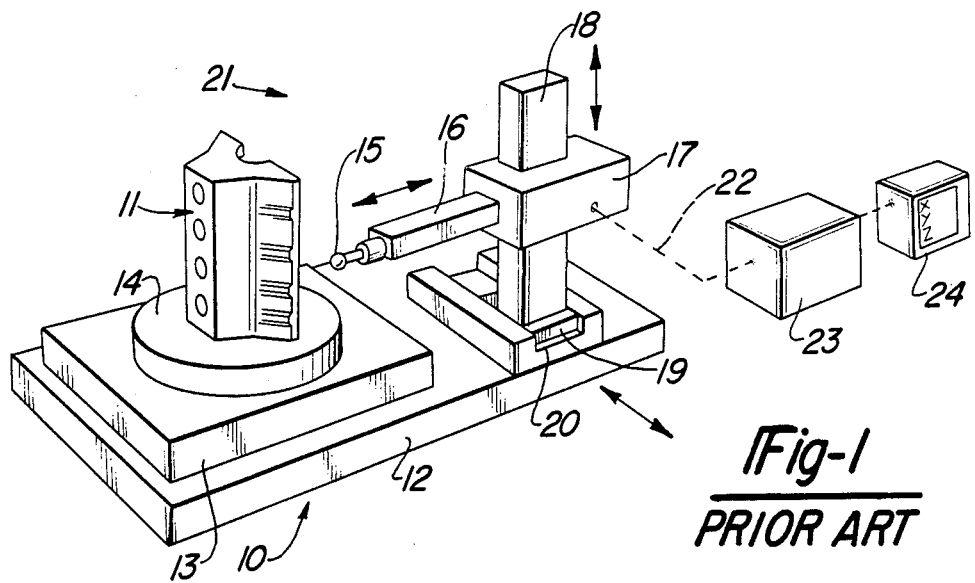
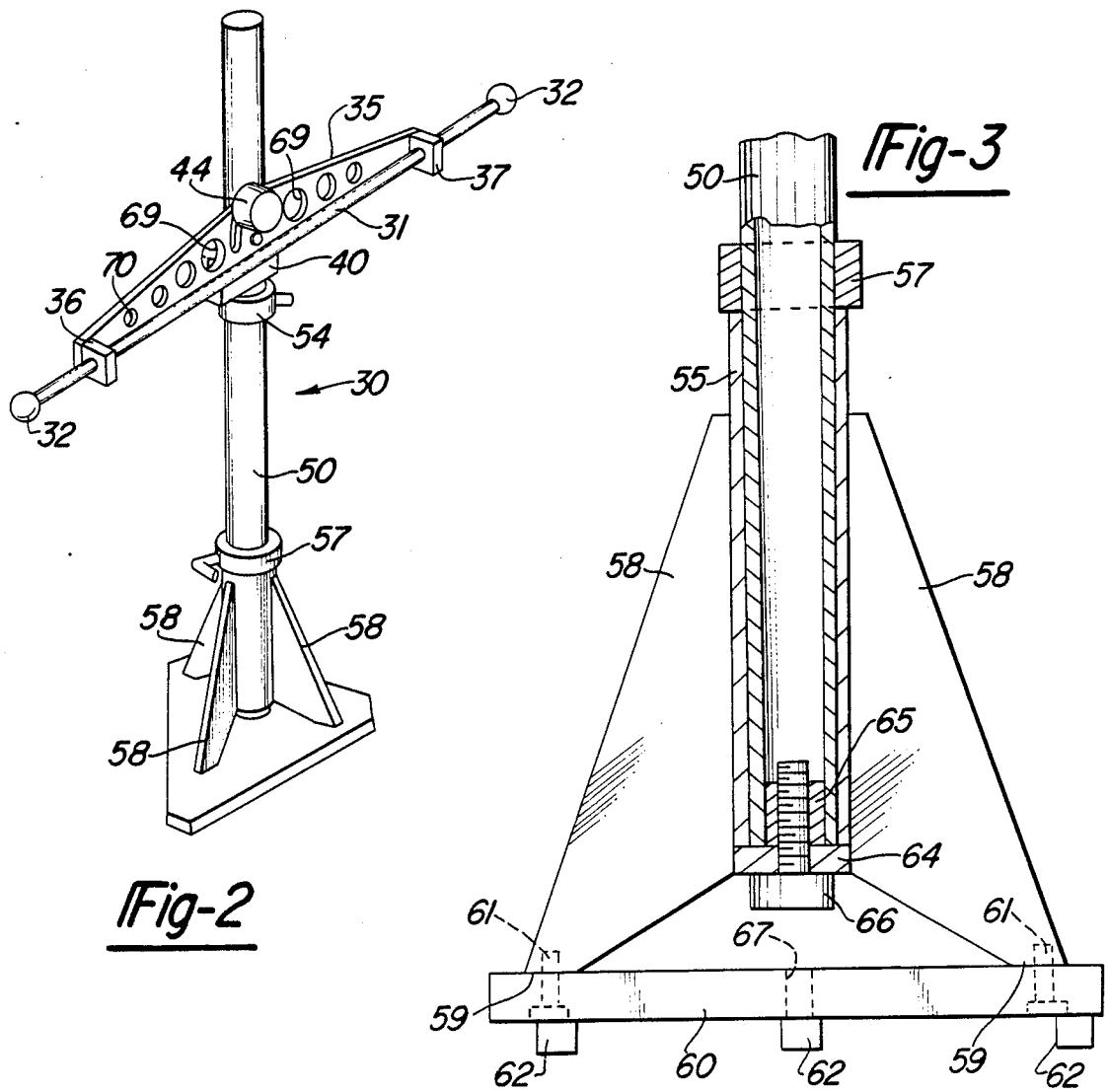

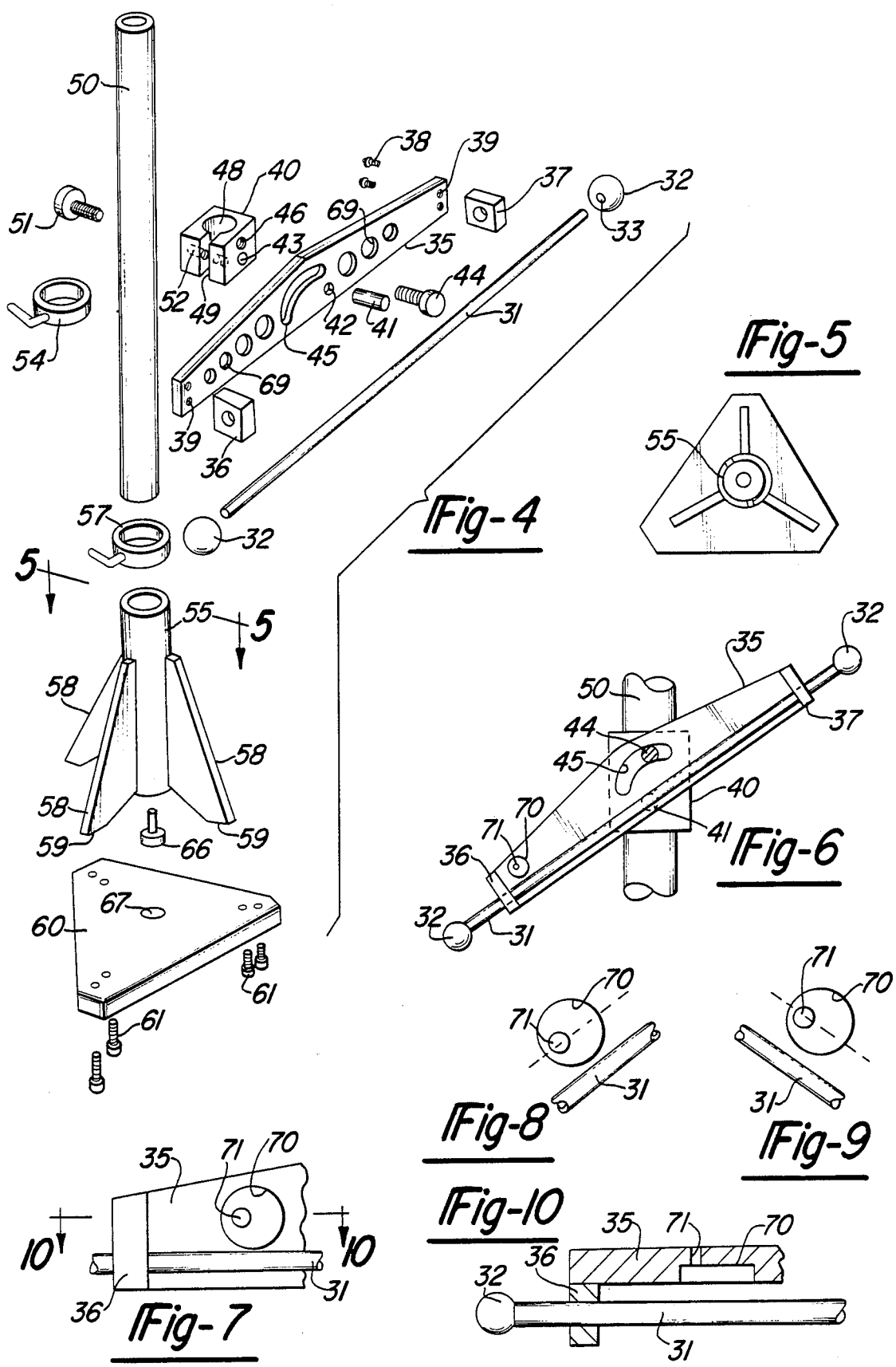

ADJUSTABLE BALL BAR GAUGE FOR COORDINATE MEASURING MACHINE

BACKGROUND OF INVENTION

A coordinate measurement machine is used to map or measure the shape and dimensions of an article. For this purpose, the machine includes a measuring envelope or chamber within which the article to be measured is positioned, such as upon a suitable support or base. A probe is moved within the measuring envelope to contact either preselected points or randomly selected points upon the article. The movements of the probe are recorded and may be translated into three dimensional readings, as for example, into X, Y and Z axis readings, or into other useful data. Thus, when the probe contacts a point on the surface of the article, a signal is produced which is converted into coordinate measurements or other data through a suitably programmed computer.

The measurements produced by the coordinate measuring machine probe contacts with the article may be used for a variety of purposes, including producing drawings of the article, determining surface shapes or contours, assisting in designing the article, determining dimensions and volumes, etc. The sizes and construction of coordinate measurement machines may vary, but typically they are of a substantial size in order to measure substantial size items. For example, a coordinate measurement machine may be used to measure an automotive engine block, or it may be used to measure an automobile body or similarly large articles.

Because accurate measurements are usually required, the accuracy of the coordinate measuring machine itself must be periodically tested. For that purpose, a suitable gauge is needed for producing test data generated by test movements and contacts of the probe. That test data can be used to determine equipment inaccuracies and needed compensations for any such inaccuracies.

The probe in a coordinate measurement machine is typically mounted upon an arm connected to a movable support system by which the probe may be moved three dimensionally within the envelope or chamber or volumetric area within which the measuring is performed. Thus, inaccuracies may arise because of varying tolerances or dimensional inaccuracies of the parts of the probe support system. Such inaccuracies may vary at different places or probe positions within the envelope. Thus, it is desirable to provide a gauge system which can be used to determine the accuracy of the probe generated measurements between spaced apart points located at numerous places within the envelope. This is particularly needed because the amount of measurement inaccuracies may change materially at the outer areas of the measuring envelope as compared wih central locations of the envelope due to greater movements of the probe support system at the outer areas.

In the past, testing the accuracy of the measurements produced by a coordinate measurement machine has been relatively time-consuming. When the coordinate measurements are tested, the equipment is unavailable for its measuring function which, because of the expense of such equipment, is costly down-time. Thus, there has been a need for a gauge system which is usable to rapidly check the accuracy of the measurements of a coordinate measuring machine within all of the portions of the measuring envelope. This invention relates to a ball bar gauge system useful to produce measuring data for testing the accuracy of a coordinate measurement machine.

SUMMARY OF THE INVENTION

The invention herein relates to a ball bar gauge useful for testing the accuracy of the measurements of a coordinate measurement machine. The gauge is particularly useful for checking the accuracy of volumetric measurements, the straightness and squareness of the coordinate measurement axes, and the accuracy of the positions of the measuring points within the measurement envelope, as well as for measuring and gauging the accuracy of distances between points and the repeatability of the measurement data.

The invention contemplates a ball bar gauge which comprises an elongated shaft having spherical balls upon its opposite ends for providing contacts for the machine probe. The shaft is mounted upon a pivot plate which is pivotally mounted upon a vertical stancheon or post so that the plate may be rotated 360° within both a horizontal and a vertical plane and may be vertically adjusted for height changes. The stancheon is carried by a support base having a tubular socket, which receives the stancheon or post, and a three point support. The entire unit may be manually moved into the measuring envelope of a coordinate measurement machine and placed upon the article support of the machine. The horizontal and vertical angularities of the ball bar may be infinitely adjustable and its height may be adjustable within the limits of the height of the stancheon so that the gauge may be rapidly moved about within all points of the measuring envelope.

The pivot plate is provided with a locator which may be contacted by a probe for accurately locating the position and the angularity of the pivot plate, and consequently, the ball bar, within the measuring envelope. Thus, by making numerous changes in the position of the ball bar within the measuring envelope and contacting the two balls after each change, the signals generated and processed through the machine computer provide test data for determining the accuracy of the measurements of the machine at different locations.

An object of this invention is to provide a gauging device which allows the operator of a coordinate measuring machine to rapidly check the volumetric accuracies of the machine, the geometrical accuracies (such as the straightness of axes, squareness of axes, position accuracies) and the total measuring accuracies (such as the axial length measuring accuracy, volumetric length measuring accuracy, and length measuring repeatability) within the entire measuring envelope of the coordinate measuring machine. Consequently, probe errors, scale errors, distortions of the physical parts of the machine and even computer software errors, can rapidly be determined.

A further object of this invention is to provide a gauging device which can be easily and rapidly placed within and removed from the measuring envelope of a coordinate measuring machine, can be easily moved about within the machine measuring envelope for providing test data whenever desired.

Another object of this invention is to provide a highly accurate, but inexpensive gauging device which does not require any special training or equipment to use within the coordinate measuring machine.

These and other objects and advantages of this invention will become apparent upon reading the following description, of which the attached drawings form a part.

DESCRIPTION OF DRAWINGS

FIG. 1 is a perspective, schematic view showing the general construction of a typical coordinate measuring machine.

FIG. 2 is a perspective view illustrating the ball bar gauge, with the ball bar arranged at an angle relative to the horizontal.

FIG. 3 is an enlarged, cross-sectional, fragmentary view of the lower, base portion of the gauge.

FIG. 4 is a perspective, disassembled view of the parts of the ball bar gauge.

FIG. 5 is a plan view, taken in the direction of arrows 5—5, of the gauge support base.

FIG. 6 is an enlarged, elevational view of a portion of the gauge showing the pivot plate and ball bar arranged at an angle relative to the horizontal.

FIG. 7 is an enlarged, fragmentary view of one end of the pivot plate and the position locator socket and hole.

FIGS. 8 and 9 show the position locator socket and hole at different angles relative to the horizontal.

FIG. 10 is an enlarged, fragmentary view of an end of the pivot plate and ball bar taken in the direction of arrows 10—10 of FIG. 7.

DETAILED DESCRIPTION

FIG. 1 schematically illustrates a coordinate measuring machine 10. The machine is used to measure the shapes and dimensions of surfaces of an article, as for example, an engine block 11 or a larger article such as an automobile body or body part, or smaller articles. The machine includes a floor or platform 12 upon which a base 13 is located for supporting a support plate 14 upon which the article is positioned.

The article is repeatedly contacted by a probe 15 which is mounted upon an arm 16 that moves towards and away from the article, as indicated by the double ended arrow adjacent the arm. The arm is carried by an arm support block 17 which is slidably mounted upon a vertical post 18 for upwards and downwards movement, as indicated by the double ended arrow adjacent the end of the block. The post 18 is carried by a post support base 19 which is slidably positioned within a post base guide channel 20 for reciprocal movement as indicated by the double ended arrow at the guide channel.

The construction of the coordinate measuring machine may vary considerably, but the general construction and operation involves a probe which is mounted for movement relative to the article to be measured so that the probe can contact selected portions of the article and the movements and locations of the probe can be detected. The article itself is contained within a measuring "envelope" or chamber, that is, the area surrounding the article. In practice, the chamber or envelope 21 may be formed by a walled, room-like area. Further, although the probe is shown as being mounted for three dimensional movement by the in and out movement of the arm carrying probe, the up and down movement of the block carrying the arm and the backwards and forward movement of the post to which the arm is connected, the probe may also be mounted upon a more universally movable support (not shown).

The movement of the probe in contacting various parts of the article may be controlled either manually or by a suitable mechanism located remotely from the probe. When the probe contacts the article, a signal is transmitted through a wiring system 22 to a computer 23 which provides data that is read out through a printer or screen or the like 24 or is otherwise used in some other data responsive equipment. The construction and operation of the computer and the readout system, whether a printer or screen or other data receiving equipment, are known and form no part of the invention herein. Thus, they are schematically illustrated to show the general relationship of the relevant parts and to give the background information relating to the operation and use of the ball bar gauge 30 which is the subject of this invention.

In using a coordinate measuring machine of the type which is schematically illustrated in FIG. 1, close accuracy of the readings is required. However, the nature of the equipment, including the tolerances required in making the parts of the equipment, as well as the looseness of the parts resulting from wear, affects the accuracy of the readings. Thus, the generated measurement readings may be more or less accurate at various places within the measuring envelope or chamber. For example, locations that are central of the chamber are more likely to be more accurate than places located along the edges or outer fringes of the measuring envelope where more probe movement is needed. These discrepancies or inaccuracies in measurements can substantially affect the data produced and later uses of that data. Thus, it is important to know, by fairly regularly taking test measurements, the varying inaccuracies of the equipment, including at different places within the measuring envelope, so that these inaccuracies can be considered when utilizing the data produced by the machine.

The ball bar gauge is utilized to provide a pair of movable test measuring points which are spaced apart a known distance and which points may be contacted by the machine probe to generate test data. Consequently, varying inaccuracies within the machine can be detected and accounted for during normal operation of the machine. The ball bar gauge is in the form of an easily movable device that can be periodically placed within the measuring envelope of the coordinate measuring machine, moved into a variety of test measuring positions and then removed from the machine.

The ball bar gauge 30 includes a bar 31 in the form of a metal shaft, preferably made of a suitable metal which has an extremely low coefficient of expansion resulting from temperature changes. At the opposite ends of the shaft, spheres or balls 32 are mounted. The mounting may be accomplished by providing openings or sockets 33 (see FIG. 4) within the spheres for receiving the ends of the shaft 31.

The ball bar is carried upon a pivot plate 35, which is a flat, elongated plate (e.g., see FIG. 4). Centrally bored flanges or ears 36 and 37 are secured to the opposite ends of the pivot plate by means of screws or dowels 38 fitted through screw receiving holes 39 in the plate and screw holes (not shown) in the flanges. One of the flanges or ears 36 is sized to tightly grasp and hold the ball bar shaft 31. The opposite flange or ear 37 loosely holds the shaft 31. Thus, should any longitudinal expansion of the shaft occur during substantial temperature changes, the expansion is accommodated by endwise movement of the shaft within the flange 37.

The pivot plate 35 is mounted upon a pivot clamp 40 by means of a pivot pin 41 that extends through a hole 42 in the pivot plate and a corresponding hole 43 in the pivot clamp. In addition, the pivot plate is also secured to and locked against the pivot clamp by means of an angularity adjustment screw 44 that extends through an arcuate slot 45 in the pivot plate and threadedly engages a screw hole 46 in the clamp.

The pivot clamp has a central bore 48, with the body of the clamp having a split 49. The clamp bore 48 receives a vertical stancheon or post 50 which is preferably made of a round tube or the like. A manually applied clamping screw 51, extending into a screw hole 52 in the pivot clamp, frictionally locks the clamp in position upon the stancheon or post. However, to insure against unwanted downward movement of the pivot clamp, a releasable belt or ring type clamp 54 is fastened around the stancheon, beneath and supporting the pivot clamp. Any suitable releasable belt or ring clamp may be used for this purpose.

The lower end of the stancheon or post 50 is held within a tubular support socket 55. A sleeve, such as a belt or ring type clamp 57 or a tubular cylinder is secured upon the post 50. The sleeve is arranged to abut against the top of the support socket 55.

The support socket 55 is provided with three fin-like legs 58 (see FIG. 3) which may be welded to the socket at equally spaced apart angular distances. The lower ends of the legs are angled to provide short, flat contact areas 59 which are rested upon a triangular base plate 60 and secured to the plate by means of screws 61. Short legs or pads 62 are attached to the lower surface of the base plate 60, at each of its three corners, to give a three point support.

The stancheon or post 50 is releasably fastened within the socket. The fastener includes a washer-like closure 64, secured to the lower surface of the socket, a threaded nut 65 secured within the lower end of the stancheon, and a screw 66 which extends through the closure 64 and is threadedly secured to the nut 65. By manually turning the screw 66, the lower end of the post 50 may be unfastened. The stancheon or post 50 is released from the upper end of the socket by removing the screw 66 and pulling the post upwardly.

Instead of the screw 66, a much longer screw may be used and extended through a central hole 67 formed in the triangular base plate 60. The substitute screw would necessarily have to have a longer threaded shank so that it extends upwardly, through the space beneath the three support legs 62, and into the threaded nut 65.

A number of holes 69 are formed in the pivot plate 35 (see FIG. 4) in order to reduce its weight and make it less susceptible to movement by air currents in the measuring envelope.

In operation, the ball bar gauge 30 is positioned upon the coordinate measuring machine support 14, within the measuring envelope. The probe 15 is moved to contact each of the two balls 32. That yields a straight line dimension which should be the same as the known length of the shaft. Preferably, the distance measured by the probe is from the center point of one ball to the center point of the opposite ball, with the computer making the necessary dimensional adjustments to compensate for the fact that the probe contacts the outside surfaces of the balls rather than their centers.

The pivot plate 35 is then repeatedly adjusted into different positions and angles by first, loosening the clamp screw 51 of the pivot clamp 40 so that the pivot clamp may be rotated about a vertical axis into different positions. That permits positioning of the pivot plate at infinite locations in a horizontal plane. By loosening the pivot plate angular adjustment screw 44, the pivot plate may be rotated in a vertical plane about its pivot pin 41 and fixed in position by tightening the adjustment screw 44 relative to the arcuate slot 45 in the pivot plate. That permits angular adjustments in the vertical plane.

In addition, the elevation or height of the ball bar may be adjusted by moving the pivot clamp 40 upwardly or downwardly along the stancheon 50. Thus, the ball bar position may be universally adjusted so that it is positioned, as desired, within the measuring envelope.

A locating means is provided for accurately locating the position of the ball bar within the measuring envelope. This locating means comprises a circular locator socket 70 (see FIGS. 6-10) formed in the exposed surface of the pivot plate 35, preferably near one end thereof. A locator hole 71 extends through the plate, within the locator socket. The hole is axially aligned with, but offset relative to the center point of the socket. FIG. 6 shows the location of the socket and locator hole on the pivot plate. FIGS. 7, 8 and 9 illustrate the relative positions of the locator hole and the locator socket centers when the pivot plate is angled relative to the horizontal.

The operator of the equipment may contact the inner wall of the locator socket 70 and the hole 71 with the probe in order to determine exactly where they are located and to determine the angularity of the pivot plate, and thus, the angularity of the ball bar. For some purposes, a separate probe may be used as a means of cross-checking the basic probe. Some coordinate measuring machines may have multiple probes and thus, one of the separate probes may be used in connection with the tests.

As can be seen, by substituting the ball bar gauge for an article to be measured within the measurement envelope or chamber, a number of different measurements can be obtained and used for cross-checking or testing the equipment itself. For example, geometrical accuracies can be checked, including the straightness of the axes, the squareness of the axes of the equipment and the position accuracy of the probe and axes. Likewise, measuring accuracies of such items as the axial length measuring accuracy, the volumetric length measuring accuracy and the length measuring repeatability can all be tested with this gauge. The gauge is usable on all coordinate measuring machines of the general type disclosed. Significantly, the gauge, due to its multiple positioning ability, as well as because it can be easily moved around within the chamber, can be used to determine whether the machine retains its measuring accuracy throughout the envelope.

Because the measuring takes place by contacting the balls 32 with the probe, with the distances measured being from the center point of one ball to the center point of the other ball, conducting the test contacts can be accomplished rapidly. That is, by merely contacting the probe against the spherical surface of the ball, the desired measurements, i.e., from center point to center point, are quicky established without any need for undue operator care.

This invention may be further developed within the scope of the following claims. Accordingly, it is desired that the foregoing description be considered as illustrative of an embodiment of the invention claimed.

What is claimed is:

1. An adjustable ball bar gauge for testing the accuracy of shape and size data produced by a coordinate measuring machine having an article support and a surrounding measuring envelope within which an article to be measured is located upon the support, and having at least one probe that is movable within the envelope to contact points on the article surface for providing signals which may be fed through a computer programmed to produce desired measurement data of the article from such signals, comprising:

an elongated bar having opposite probe contact ends;
a bar support means for positioning upon the machine article support within the measuring envelope in place of an article;
said bar support means including a plate means upon which the bar is mounted and a base means having a releasable connector fastening the plate means upon the base means;
said releasable connector being vertically adjustable and said plate means being angularly adjustable relative to the vertical and horizontal directions for varying the height of the bar above the machine article support and for varying the three dimensional angularity and positions of the bar within the machine measuring envelope;
whereby the positions of the two contact ends remain constant relative to each other, but may be infinitely varied within the envelope and relative to the machine article support, so that the probe may contact ends when the bar is repositioned and held in numerous positions within the measuring envelope to produce measurement data for use in testing the accuracy of the usual data produced by contacting the probe against an article surface at different locations within the measuring envelope.

2. An adjustable ball bar gauge as defined in claim 1, and said plate means including an elongated pivot plate upon which said bar is secured and which is fastened to said base means by the releasable connector.

3. An adjustable ball bar gauge as defined in claim 2, and said pivot plate having centrally bored flanges formed upon its opposite ends, with the bar extending through said flanges for mounting the bar upon the pivot plate.

4. An adjustable ball bar gauge as defined in claim 3, and wherein the bar is immovably clamped within one of the flanges, but is axially slidable within the other flange to allow longitudinal expansion and contraction of the bar.

5. An adjustable ball bar gauge as defined in claim 2, and including locator means on the pivot plate, against which the probe may be contacted for locating the physical position of the pivot plate, and consequently the bar, within the measuring envelope.

6. An adjustable ball bar gauge as defined in claim 5, and said locator means including a depressed socket formed in the surface of the pivot plate, and a hole formed in the pivot plate, within the socket, but having its center line offset relative to the socket center line, whereby the probe may contact an interior surface wall of the depressed socket and of the offset hole to thereby determine the position of the pivot plate within the measuring envelope.

7. An adjustable ball bar gauge as defined in claim 2, and said base means including a vertically arranged tube-like stancheon;
an adjustable ring-like clamp slidably and rotatably mounted upon the stancheon for adjusting the height of the clamp relative to the stancheon;
said releasable connector arranged in contact with the clamp and said pivot plate being connected to said releasable connector by means of a pivot, about which the pivot plate may rotate generally in a vertical plane, and including means for fixing the pivot plate position relative to the releasable connector.

8. An adjustable ball bar gauge as defined in claim 7, and said base means including a vertically arranged tube-like socket within which the stancheon is inserted;
means for fastening the stancheon within the socket;
said socket having three separate legs secured thereto for providing a three point support for the socket;
a base plate arranged generally horizontally beneath the socket, and said legs each having their lower ends secured to the base plate.

9. An adjustable ball bar gauge as defined in claim 8, and said legs being formed of plates having vertical edges secured to the socket and having lower edges which are generally spaced away from the upper surface of the base plate, but which terminate with outer edge portions which contact and are secured to the base plate so as to support the socket at three widely spaced, limited size areas upon the base plate.

10. An adjustable ball bar gauge useful for testing the volumetric accuracy of a coordinate measuring machine having a measuring envelope within which an article to be measured is supported for engagement by a movable probe that contacts different points upon the article for providing signals which are fed through a computer programmed to produce measurement data about the shape and size of the article, comprising:

a base for supporting the gauge within the measuring envelope of the machine;
a vertically arranged stancheon secured to and supported by said base;
a pivot plate secured to said stancheon by a connector means which provides vertical, height adjustment of the pivot plate and horizontal and vertical angularity adjustment of the pivot plate relative to the stancheon and including means for releasably fixing the plate at selected height and angularity positions;
a ball bar including an elongated shaft mounted upon said pivot plate and having contact ends opposite one another against which the machine probe may be contacted;
whereby the gauge may be inserted within the machine envelope, in place of an article to be measured, and the probe may be contacted against the opposite ends of the shaft while the shaft is temporarily fixed in any preselected position, and then the positions of the shaft may be repeatedly changed while repeating the probe contacting of the ends of the shaft, to produce test data for comparison with and to determine the accuracy of the measuring data provided by the machine during the measurement of an article.

11. An adjustable ball bar gauge as defined in claim 10, and including said ends being formed of spherical balls connected to the opposite ends of the elongated shaft forming the ball bar;
flanges formed upon the pivot plate and having openings through which the shaft of the ball bar is inserted for mounting the ball bar upon the pivot plate.

12. An adjustable ball bar gauge as defined in claim 11, and said stancheon;

said connector means including a member having a bore slidably receiving said stancheon for slidably positioning the member upon the stancheon;

and said pivot plate being connected by a pivot pin extending through the center of the pivot plate into the member for pivoting the pivot plate in a generally vertical plane relative to the stancheon;

and a releasable fastener fixing the pivot plate, in preselected positions, to the member for thereby adjusting the angularity of the ball bar in the vertical plane, with the ball bar being angularly adjustable in the horizontal plane by rotating the member relative to the stancheon, and being vertically adjustable by moving the member upwardly and downwardly upon the stancheon.

13. An adjustable ball bar gauge as defined in claim 12, and said base including a vertically arranged socket into which a lower end of the stancheon is positioned, with said socket being supported by three separate legs to provide a three point support for the base.

14. An adjustable ball bar gauge as defined in claim 13, and including said legs having support tip portions for resting upon a horizontal surface;

a generally horizontally arranged base plate upon which said leg portions are rested, and fastener means securing the legs to the base plate;

and means securing the stancheon within the socket.

* * * * *